(12) United States Patent
Hamer et al.

(10) Patent No.: US 8,536,241 B2
(45) Date of Patent: Sep. 17, 2013

(54) (METH)ACRYLOYL PRESSURE-SENSITIVE FOAM ADHESIVES

(75) Inventors: Craig E. Hamer, Woodbury, MN (US); Ilyess H. Romdhane, Woodbury, MN (US); Andrew Satrijo, St. Paul, MN (US); Thomas E. Augustine, Hager City, WI (US); Neil J. Fischer, Lakeland, MN (US); Michael C. Martin, Hudson, WI (US); Robert B. Secor, Stillwater, MN (US); Robert D. Waid, Oakdale, MN (US); Sharon Wang, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 236 days.

(21) Appl. No.: 13/115,464

(22) Filed: Jun. 22, 2011

(65) Prior Publication Data

US 2012/0004335 A1 Jan. 5, 2012

Related U.S. Application Data (60) Provisional application No. 61/360,056, filed on Jun. 30, 2010.

(51) Int. Cl.
| | |
|---|---|
| C08J 9/00 | (2006.01) |
| C08J 9/06 | (2006.01) |
| C08J 9/08 | (2006.01) |
| C08J 9/10 | (2006.01) |
| B28B 3/20 | (2006.01) |
| B29C 44/50 | (2006.01) |

(52) U.S. Cl.
USPC ......... 521/97; 521/94; 521/79; 521/134; 264/176.1; 264/51; 156/78

(58) Field of Classification Search
USPC ......... 521/79, 97, 134; 156/78; 264/51, 264/176.1
See application file for complete search history.

(56) References Cited

U.S. PATENT DOCUMENTS

| | | | |
|---|---|---|---|
| 3,691,140 A | 9/1972 | Silver | |
| 3,906,027 A | 9/1975 | Meussdoerffer et al. | |
| 4,059,466 A | 11/1977 | Scholl et al. | |
| 4,059,714 A | 11/1977 | Scholl et al. | |
| 4,166,152 A | 8/1979 | Baker et al. | |
| 4,167,639 A | 9/1979 | Billenstein et al. | |
| 4,415,615 A * | 11/1983 | Esmay et al. | 428/41.5 |
| 4,619,979 A | 10/1986 | Kotnour et al. | |

(Continued)

FOREIGN PATENT DOCUMENTS

| | | |
|---|---|---|
| JP | 2006-036870 | 2/2006 |
| WO | WO 02/18511 | 3/2002 |
| WO | WO 2008/116033 | 9/2008 |

OTHER PUBLICATIONS

PCT International Search Report, PCT/US2011/039212, dated Jul. 5, 2012.

(Continued)

*Primary Examiner* — Randy Gulakowski
*Assistant Examiner* — Kara Boyle
(74) *Attorney, Agent, or Firm* — Kent S. Kokko (57) ABSTRACT

This disclosure provides (meth)acryloyl pressure-sensitive adhesive foams and foam articles having one or more of the following properties: small cells, uniform cell sizes, pressure sensitive adhesive compositions, compliance to irregular substrates and vibration damping, and shock absorbing properties.

18 Claims, 2 Drawing Sheets

(56) References Cited

U.S. PATENT DOCUMENTS

| | | | |
|---|---|---|---|
| 4,636,432 A | 1/1987 | Shibano et al. |
| 4,656,218 A | 4/1987 | Kinoshita |
| 4,778,631 A | 10/1988 | Cobbs, Jr. et al. |
| 4,779,762 A | 10/1988 | Klein et al. |
| 4,843,134 A | 6/1989 | Kotnour et al. |
| 5,045,569 A | 9/1991 | Delgado |
| 5,158,986 A | 10/1992 | Cha et al. |
| 5,342,858 A | 8/1994 | Litchholt et al. |
| 5,342,986 A | 8/1994 | Pohmer et al. |
| 5,429,856 A | 7/1995 | Krueger et al. |
| 5,502,251 A | 3/1996 | Pohmer et al. |
| 5,602,221 A | 2/1997 | Bennett et al. |
| 5,637,646 A | 6/1997 | Ellis |
| 5,804,610 A | 9/1998 | Hamer et al. |
| 5,866,053 A | 2/1999 | Park et al. |
| 5,932,298 A | 8/1999 | Moon |
| 6,051,174 A | 4/2000 | Park et al. |
| 6,103,152 A | 8/2000 | Gehlsen et al. |
| 6,294,249 B1 | 9/2001 | Hamer et al. |
| 6,586,483 B2 | 7/2003 | Kolb et al. |
| 6,586,489 B2 * | 7/2003 | Gehlsen et al. ............... 521/134 |
| 6,638,985 B2 | 10/2003 | Gehlsen et al. |
| 6,664,354 B2 | 12/2003 | Savu et al. |
| 6,797,371 B1 | 9/2004 | Gehlsen et al. |
| 7,094,463 B2 | 8/2006 | Haas et al. |
| 2004/0260024 A1 | 12/2004 | Gehlsen |

OTHER PUBLICATIONS

Secor, "Analysis and Design of Internal Coating Die Cavities," Liquid Film Coating—Scientific Principles and Technology, edited by S. F. Kistler and P. Schweizer, Chapman & Hall, Inc, pp. 369-398.

McHugh, et al., "*Supercritical Fluid Extraction*," $2^{nd}$ Edition, Butterworth-Heinemann Series in Chemical Engineering, N.Y., 1994, pp. 356-366.

Kissa, Erik, "Fluorinated Surfactants" Surfactants Science Series, vol. 50, Marcel Dekker, Inc., New York 1994.

\* cited by examiner

(METH)ACRYLOYL PRESSURE-SENSITIVE FOAM ADHESIVES

CROSS REFERENCE TO RELATED APPLICATION

This application claims the benefit of U.S. Provisional Patent Application No. 61/360,056, filed Jun. 30, 2010, the disclosure of which is incorporated by reference herein in its entirety.

FIELD OF INVENTION

This invention relates to (meth)acryloyl pressure-sensitive adhesive foams and foam articles having one or more of the following properties: small cells, uniform cell sizes, pressure sensitive adhesive compositions, compliance to irregular substrates vibration damping, and shock absorbing properties. The invention further relates to a method for making the adhesive foams and a method for coextruding the foams with other materials.

SUMMARY OF INVENTION

In one aspect, the present disclosure relates to continuous processes for producing (meth)acryloyl pressure-sensitive adhesive foams. In one aspect, the present disclosure provides a continuous method for producing a foam material comprising:

(1) mixing at least one pressure-sensitive (meth)acryloyl polymer and a $CO_2/N_2$ blowing agent mixture in an extrusion apparatus having an exit shaping orifice (e.g. extrusion die) at a temperature to form a melt solution wherein the blowing agent is uniformly distributed throughout the polymeric material;

(2) conveying the melt solution though the final section of the extrusion apparatus, wherein the system pressure is 250 to less than 1000 psi (1.7 to 6.9 Mpa);

(3) passing the solution through said exit shaping orifice and exposing the solution to atmospheric pressure, whereby the blowing agent expands causing nucleation and cell formation resulting in the melt solution foaming and solidifying at or about the time it exits the shaping orifice;

(4) rapidly cooling the polymer melt to arrest cell growth and coalescence, and (5) crosslinking the resulting acrylate foam polymer.

This disclosure provides adhesive foam-containing articles that can be designed to exhibit a wide range of properties for a myriad of applications. The disclosure provides a way to control the cell size and cell size distribution of a foam by adjusting, manipulating, or controlling the blowing agent concentration, the exit temperature, and/or the exit pressure of the foamable melt solution.

The disclosure provides articles comprising a foam having cell sizes of 2 to 200 micrometers, preferably 5 to 50 micrometers. The foam may alternatively, or additionally, have a cell size distribution with a polydispersity from 1.0 to 2.0, preferably from 1.0 to 1.5, more preferably from 1.0 to 1.2.

The disclosure provides articles wherein the foam of the invention comprises at least one layer in a multi-layer construction whereby the pressure-sensitive adhesive foam is coextruded with at least one other material, which may be a foamed or unfoamed material. Another aspect of the disclosure is a process to coextrude the foams with other polymeric materials.

The (meth)acrylate pressure-sensitive adhesive foams present one or more of the following advantages:

The ability to alter, adjust, or control the foam density, average cell size, and cell size distribution of foams. This allows the properties of the produced foams to be optimized based on their intended use. Small cells, as opposed to larger cells, will not as easily propagate defects or cracks in the foam structure. Another advantage of small cell sizes is that thinner foam substrates can be produced, e.g. less than 15 mils.

In at least one embodiment the adhesive foams may have high energy dissipation properties to be used on bonding applications where vibration damping is required. An advantage of at least one embodiment of foam of the present invention is that it can provide the conformability and compliance to uneven or irregular surfaces or substrates.

Figure 3:
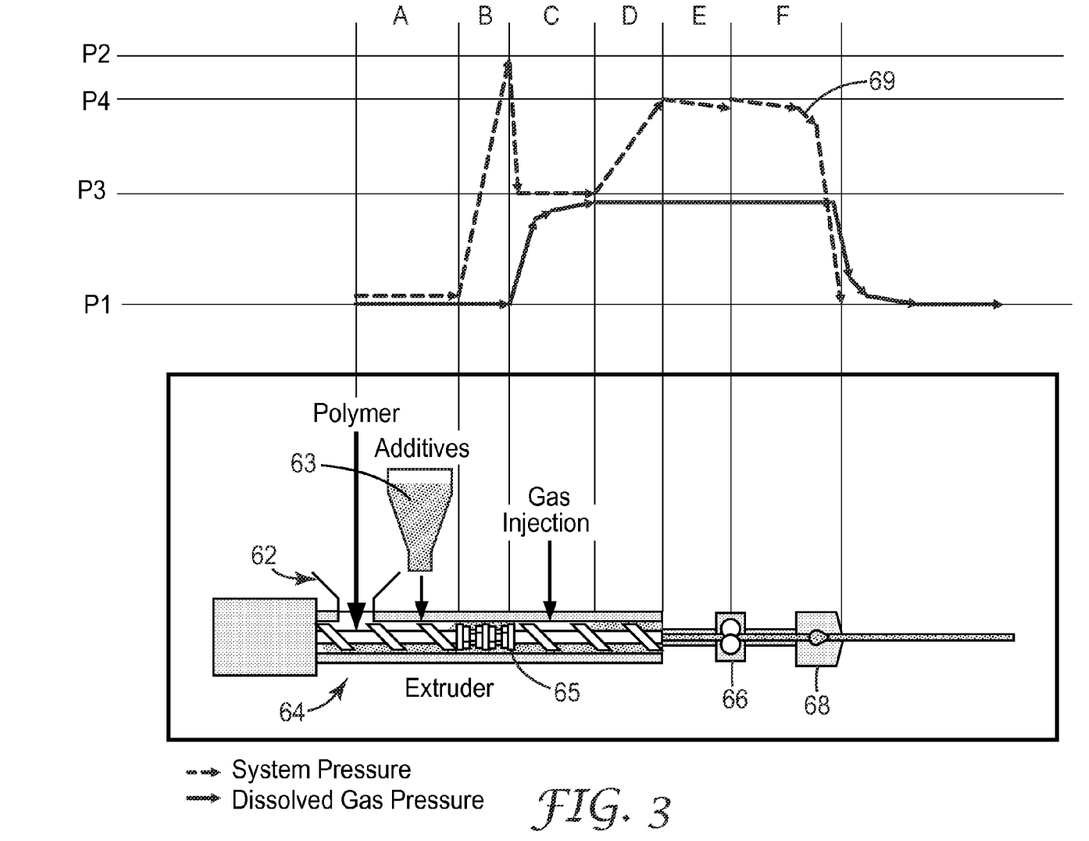
FIG. 3 illustrates pressure profile of an extrusion embodiment of this disclosure.

As used in this invention:

"small-cell foam" means a foam having cell sizes of 2 to 200 micrometers ($\mu m$), preferably 5 to 50 $\mu m$;

"closed-cell" means a foam material that contains substantially no connected cell pathways that extend from one outer surface through the material to another outer surface;

"operating temperature" means the temperature that must be achieved in the extrusion process, prior to the addition of the physical blowing agent, to melt all of the polymeric materials in the melt mix;

"$T_g$" means the glass transition temperature, i.e., the temperature at which a polymer changes from a fluid to a solid state;

"extruder exit temperature" and "extruder exit pressure" mean the temperature and pressure of the extrudate in the final section or sections of the extrusion apparatus immediately prior to the die, and preferably in the die—as represented by section F in FIG. 3;

"melt solution" or "melt mixture" or "melt mix" means a melt-blended mixture of (meth)acrylate copolymers, any desired additives, and blowing agent(s) wherein the mixture is sufficiently fluid to be processed through an extruder;

"neat polymer" means a (meth)acrylate copolymers having no additives, and at standard temperature and pressure;

"nucleation" means a process by which a homogeneous solution of (meth)acrylate copolymers and dissolved molecules of a gas under ambient conditions undergoes formations of clusters of molecules of the species that define "nucleation sites" from which cells will grow; i.e., it is a change from a homogeneous solution to a multi-phase mixture in which, throughout the polymeric material, sites of aggregation of at least several molecules of physical blowing agent are formed (if immiscible polymeric materials are used, the physical blowing agent will typically form single-phase solutions with one or more of the polymer materials, but the polymers will typically not combine to form a single phase);

"foam density" means the weight of a given volume of foam;

"spherical" means generally rounded; it may include spherical, oval, or circular structure;

"polymer matrix" means the polymeric, or "non-cell," areas of a foam;

"(meth)acryloyl is inclusive of methacryloyl and acryloyl.

"acryloyl" is inclusive of acrylic esters and amides.

Other features and advantages of the invention will be apparent from the following figures, detailed description, and claims.

DETAILED DESCRIPTION

The present disclosure provides a continuous process for generating uniform and/or small cell adhesive foams using a tandem or twin screw extrusion system. This process involves mixing one or more adhesive (meth)acryloyl polymers with a physical blowing component comprising carbon dioxide and nitrogen, the blowing agent component being soluble with the adhesive (meth)acryloyl polymers to form a melt solution. The temperature and pressure conditions in the extrusion system are preferably sufficient to maintain the adhesive (meth)acryloyl polymers and blowing agent as a homogeneous solution. The $CO_2$ of the blowing agent component swells the polymeric material increases the solubility and diffusion coefficient of the $N_2$.

It has been found that by adding a physical blowing agent, the adhesive (meth)acryloyl polymers may be more efficiently processed and foamed at lower temperatures and pressures than otherwise might be required. The lower temperature can allow the foam to cool and stabilize (i.e., reach a point of sufficient solidification to arrest further cell growth and coalescence) soon after it exits the die, thereby making it easier to arrest cell growth and coalescence while the cells are smaller and more uniform.

As the adhesive (meth)acryloyl polymer melt solution exits the extruder through a shaping die, it is exposed to the much lower atmospheric pressure causing the blowing agent to expand and come out of the melt solution. This causes nucleation and cell formation resulting in foaming of the melt solution, resulting in the formation of small and uniform cells in the polymeric material.

In addition to the increase in nucleation and cell expansion, adiabatic cooling of the foam may occur as the blowing agent expands. The foams are typically and preferably fully formed at the exit of the die, as soon as the melt solution is exposed to ambient pressure and temperature. When the melt solution exit the die and is exposed to ambient temperatures, the viscosity of the melt rapidly increases, reducing flow, which in turn arrests the growth and coalescence of the foam cells within seconds or, more typically, a fraction of a second.

Immediately upon exiting the die, the foamed adhesive polymer is rapidly quenched at a temperature to maintain cellular structure and retard outgassing. Preferably, the (meth)acryloyl adhesive polymers are cooled or quenched at temperatures at least 100° C., preferably at least 150° C., below the melt process temperature, thereby increasing the viscosity and locking in the shape and cellular structure.

Figures 1, 2:
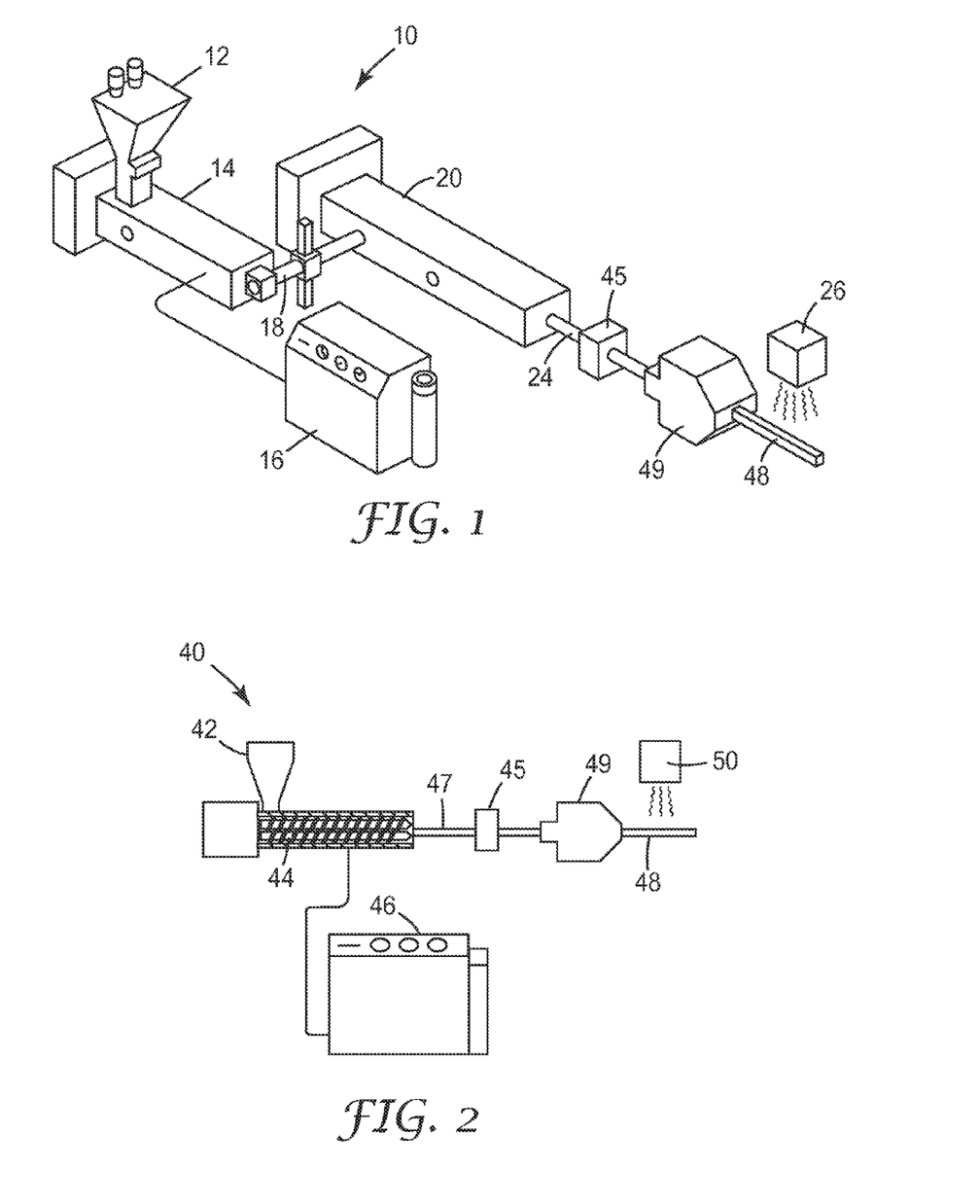
FIG. 1 illustrates a tandem extruder system that may be used in a process of the present invention.
FIG. 2 illustrates a twin screw extruder system that may be used in a process of the present invention.

FIG. 1 illustrates a tandem extrusion process that can be used to make the foams of the present invention. To form a melt solution of polymer and physical blowing agent, adhesive (meth)acryloyl polymer is initially fed into a first extruder 14 (typically a single screw extruder) which softens and conveys the adhesive (meth)acryloyl polymer. The polymers may be added to extruder 14 in any convenient form, including pellets, billets, packages, strands, and ropes. Additives may be added with the adhesive (meth)acryloyl polymers but may also be added further downstream. Optionally, volatiles, such as unreacted monomers, oligomers, solvents or other components may be removed at this stage by subjecting the polymer melt to a vacuum.

The blowing agent, comprising a mixture of $CO_2$ and $N_2$, is injected near the exit of the first extruder from gas source 16.

The adhesive (meth)acryloyl polymer, additives, and blowing agent are melt-mixed in the first extruder 14. The purpose of the melt-mixing step is to prepare a foamable, extrudable composition in which the blowing agent and other additives, to the extent present, are distributed homogeneously throughout the molten polymeric material. Specific operating conditions are selected to achieve such homogeneous distribution based upon the properties and characteristics of the particular composition being processed. The operating and exit pressures in the extruder 14 should be sufficient to prevent the blowing agent from expanding thereby causing nucleation and cell formation in the extruder.

The operating temperature in the extruder 14 should be sufficient to melt all of the polymers in the melt mix. Generally, the temperatures are held constant through each section of the extruder and varies only ±10° C. For the (meth)acryloyl adhesive polymers, the temperature is generally at least 100° C., preferably at least 125° C., most preferably at least 150° C.

Next, the melt mix is fed to a second extruder 20 (typically a single screw extruder) through tubing 18. The second extruder 20 is generally operated at conditions (e.g., screw speed, screw length, pressure, and temperature) selected to achieve optimum mixing, and to keep the blowing agent in solution. The extruder 20 may have a generally constant temperature profile wherein the temperature of the last section or sections will bring the melt solution to the desired exit temperature.

At the exit end of the second extruder 20, the foamable, extrudable composition is metered into a die 49 which has a shaping exit orifice (e.g., an annular, rod, slit die, or shaped profile die through a length of transfer tubing 24 using a gear pump 45 that acts as a valve to control upstream extruder pressure and thereby prevent premature expansion of the blowing agent. The partial pressure of the blowing agent mixture in the final section of the second extruder, immediately preceding the die 49, is in the range of 150 to less than 1000 psi (1.7 to 6.9 Mpa), preferably 250 to 750 psi, most preferably 350 to 600 psi.

The temperature within die 49 is preferably maintained at substantially the same temperature as the temperature within transfer tubing 24 and selected such that it is at or above the temperature required to initiate expansion of the blowing agent component. The partial pressure of the blowing agent mixture in the transfer tubing before die 49 is less than 1000 psi and greater that 250 psi (1.7 to 6.9 MPa) and is approximately the same as slightly less than the pressure in the final section of the extruder. The system pressure, which is the combination of the partial pressure of the blowing agent mixture and the pressure of the polymer melt, is higher. In some embodiments the system pressure in the final section of the extrusion apparatus is 250 to less than 1000 psi (1.7 to 6.9 MPa).

Once the composition enters die 49, however, the pressure drops because the volume of the die is greater than the volume of the tubing. The pressure drop, coupled with heat transfer from the die, causes the blowing agent component to nucleate within the die, leading to foaming. The pressure within the die continues to drop further as the composition approaches the exit, further contributing to nucleation and expansion within the die. The flow rate of polymer through the extruder and the die exit opening are maintained such that as the polymer composition is processed through the die, the pressure in the die cavity remains sufficiently high to allow nucleation and foaming as the polymer composition reaches the exit opening of the die.

The relatively high pressure within the extruder 20 and die 49 prevents nucleation, cell formation, and foaming of the melt mix composition in the extruder and die. Exit pressure of the die 49 is dependent upon die orifice size, exit temperature, blowing agent concentration, polymer flowrate, polymer viscosity, and polymer type. Exit pressure of the die is typically controlled by adjusting the die orifice size, but can also be adjusted by altering the exit temperature, blowing agent concentration, and other variables. Reducing the size of the die orifice will generally increase exit pressure.

As the composition exits die 49, through the die's shaping orifice, it is exposed to ambient pressure. The pressure drop causes the blowing agent to expand, leading to nucleation and cell formation thereby causing foaming of the melt solution composition at or about the time it exits the outer opening of the die exit shaping orifice, i.e., typically within a fraction of a second.

The foam 48 is quenched, e.g., brought to a temperature at least 100° C., preferably at least 150° C., below the temperature of the molten polymeric material to arrest cell growth and coalescence. Quenching generally occurs within two to five centimeters of the die exit, more typically and preferably less than two centimeters, most preferably as the foamable material exits the die and is exposed to ambient pressure. Generally the temperature of the melt is quenched by cooling to a temperature so that the melt no longer flows; i.e. to a temperature where the viscosity is sufficiently high so that the cellular structure of the foam is maintained for a period of time sufficient to crosslink the polymer by ionizing or UV radiation, thereby stabilizing the foam structure.

The extruded foam is preferably quenched by contact with a quench roll. Where a quench roll is used, the roll temperature is preferably maintained at a temperature below about 75° F. (24° C.) and the foam is generally in contact with the roll until solidified. The quench roll should be positioned relatively close to the extruder die, the distance being dependent on the roll temperature, the extrusion rate, the foam thickness, and the roll speed. Generally, the distance from the die to the roll is about 2 cm to 5 cm. The shape of foam 48 is dictated by the shape of the die exit orifice. A variety of shapes may be produced, including a continuous sheet, including sheets with patterned profiles, a tube, a rope, etc. When it is extruded, the melt solution is at the exit temperature, a relatively low temperature compared to temperatures at which most extrusion processes are carried out. The exit temperature is chosen to rapidly arrest cell growth and coalescence.

In general, as the blowing agent separates from the homogeneous solution into a distinct phase, its swelling and/or plasticizing effect on the polymeric material decreases and the viscosity increases, therefore the blowing agent can not as easily expand or coalesce because the polymeric material becomes more viscous. As the foam material cools further, it solidifies in the general shape of the exit shaping orifice of die 49.

Upon exiting the die, the foamed polymer 48 is crosslinked by exposure to ultraviolet (UV) or ionizing radiation from source 26.

If UV radiation crosslinking is used, the (meth)acryloyl adhesive polymer component further contains a photoactive crosslinking agent to initiate free radical crosslinking of the polymer. In such embodiments where the foam is crosslinked by UV, the light sources can be of two types: 1) relatively low light intensity sources such as blacklights which provide generally 10 mW/cm$^2$ or less (as measured in accordance with procedures approved by the United States National Institute of Standards and Technology as, for example, with a UVI-MAP™ UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm$^2$, preferably between 15 and 450 mW/cm$^2$. Where actinic radiation is used to fully or partially crosslink the adhesive composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$.

Alternatively, the foam may be crosslinked by exposure to ionizing radiation. Nonlimiting examples of ionizing radiation include alpha, beta, gamma, electron-beam, and x-ray radiation. Of these sources of ionizing radiation, electron-beam irradiation and gamma irradiation are preferred. Low voltage sources of electron-beam radiation are commercially available from Energy Sciences Inc., PCT Industries and Advanced Electron Beam (AEB). Sources of gamma irradiation are commercially available from Atomic Energy of Canada, Inc. using a cobalt-60 high-energy source.

Ionizing radiation dosages are measured in kilograys (kGy). Doses of ionizing radiation can be administered in a single dose of the desired level of ionizing radiation or in multiple doses which accumulate to the desired level of ionizing radiation. The dosage of ionizing radiation cumulatively can range from about 25 kGy to about 400 kGy and preferably from about 25 kGy to about 200 kGy. Preferably, ionizing radiation can achieve the desired level of crosslinking of acrylic adhesive copolymer when the cumulative dosage of ionizing radiation exceeds 40 kGy (4 Mrads).

FIG. 2 illustrates a twin screw extrusion process that can be used to make the adhesive foams of the present invention. A single twin screw extruder 44 may be used to form a melt solution of polymer and physical blowing agent. The polymeric material is introduced into hopper 42 of extruder 44. Additives may be added with the polymer but may be added further downstream. Optionally, volatiles, such as unreacted monomers, oligomers, solvents or other components may be removed at this stage by subjecting the polymer melt to a vacuum.

A blowing agent is injected at a location downstream from a point at which the polymer has melted with gas injection equipment 46. The extruder 44 is operated with a constant or decreasing temperature profile. The temperature of the initial section(s) of the extruder must be sufficient to melt the polymeric material(s) being used. The temperature of the final section or sections of the extruder is set at temperatures to achieve the desired extrudate exit temperature.

Using a single twin screw extruder, as compared to using a tandem process, to produce a homogeneous foamable mixture requires mixing and transitioning from an operating temperature and pressure to an exit temperature and pressure over a shorter distance. To achieve a suitable melt mix, approximately the first half of the extruder screw may have mixing and conveying elements which knead the polymer and move it through the extruder. The second half of the screw may have distributive mixing elements to mix the polymer material and blowing agent into a homogeneous mixture.

As with the tandem process, the operating and exit pressures (and temperatures) should be sufficient to prevent the blowing agent from expanding and causing nucleation and cell formation in the extruder. The operating temperature is preferably sufficient to melt the polymer materials, while the last section or sections of the extruder are preferably at a temperature that will bring the extrudate to the exit temperature.

At the exit end of the extruder, the foamable, extrudable composition is metered into a die 49 having a shaping exit orifice (die) through a length of transfer tubing 47 using a gear pump 45 that acts as a valve to control upstream extruder pressure. The foam is generated in the same manner as with the tandem system. Upon exiting the die, the foamed polymer 48 is crosslinked by exposure to ionizing radiation from source 50. Suitable radiation source include e-beam, gamma, and certain UV sources.

In FIG. 3, the pressure profile of an extrusion process is illustrated. (Meth)acryloyl polymer is added to extruder 64 via hopper 62. As the polymer is melted, it is conveyed through section A at approximately atmospheric pressure P1. Optional additives may be added to the polymer melt in section A by hopper/pump/delivery device 63.

As the polymer melt mixture is conveyed to optional kneading block section 65, the pressure rapidly increases to P2 in section B. Kneading block section 65 serves as a flow restriction and isolates the pressures in sections A and section C.

As the polymer melt is conveyed past kneading block section 65, the process pressure drops to P3 in section C as the polymer melt partially fills the volume of the extruder section. The head space above the polymer melt may be noted. In section C, the blowing agent component ($CO_2$ and $N_2$) is metered in to the extruder 64 at a pressure sufficient to achieve the desired partial pressure of the blowing agent dissolved in the polymer melt. The amount of dissolved blowing agent, the partial pressure of the blowing agent in the polymer, is a functional of the head space pressure, the residence time in section C, the temperature, the amount of (meth)acryloyl copolymer, and the surface area of the (meth)acryloyl copolymer. As the blowing agent dissolves in the (meth)acryloyl copolymer, the partial pressure approaches the head space pressure, as illustrated.

As the polymer melt containing dissolved blowing agent is further conveyed through the final extruder section D, the fluid pressure is increased to P4. In section D, the system pressure at P4 includes the partial pressure of the dissolved blowing agents and the compressive force of the conveyed polymer. P4 is less than 1000 psi and greater that 150 psi (1.7 to 6.9 MPa). Section D may be configured with a pressure transducer (not shown).

In further conveying the foamable polymer melt composition having dissolved blowing agent, by gear pump 66, the system pressure may increase slightly (as illustrated) in section E, or may decease slightly. Gear pump 66 serves to control the system pressure of the polymer melt enter the die 49 and is generally less than 1000 psi (6.9 Mpa). Again, the system pressure is maintained to prevent nucleation and foam until the mixture passes through the die.

As the mixture enters section F, the system pressure begins to decrease in the transfer tube as the melt enters die 68. As previously described, the relatively high pressure within the die 68 prevents nucleation, cell formation, and foaming of the melt mix composition in the extruder and die. Exit pressure of the die 68 is dependent upon die orifice size, exit temperature, blowing agent concentration, polymer flowrate, polymer viscosity, and polymer type. Exit pressure of the die is typically controlled by adjusting the die orifice size, but can also be adjusted by altering the exit temperature, blowing agent concentration, and other variables. At approximately the exit of the die, the system pressure falls below the partial pressure of the blowing agents, and nucleation occurs. In FIG. 3, point 69 is that point immediately prior to nucleation, which pressure is less that 1000 psi. A pressure transducer (not shown) may be included to measure the pressure at that point 69 in the extrusion apparatus immediately prior to the die. The pressure in the die may be calculated as described by R. B. Secor, "Analysis and Design of Internal Coating Die Cavities," in *Liquid Film Coating—Scientific Principles and Technology*, edited by S. F. Kistler and P. Schweizer, Chapman & Hall, Inc. (1997). In the most embodiments, the pressure in the die is from 200 to 700 psi (~1.4 to 4.8 Mpa)

In some embodiments, the adhesive (meth)acryloyl foam may be coextruded with one or more additional layers, which may comprise one or more additional foam or film layers to form a multilayer article. A multilayer article may be produced by equipping die 49 with an appropriate feed block, e.g., a multilayer feedblock, or by using a multi-vaned or multi-manifold die such as a 3-layer vane die available from Cloeren, Orange, Tex. Materials or articles having multiple adjacent foam layers may be made with foam layers comprising the same or different materials. Foam articles of the present invention may comprise one or more interior and/or exterior foam layer(s). In such a case, each extrudable, foamable material may be processed using one of the above-described extrusion methods wherein melt mixtures are fed to different inlets on a multi-layer feedblock, or multi-manifold die, and are brought together prior to exiting the die.

The layers foam in generally the same manner as described above for the extrusion process. The multi-layer process can also be used to extrude the foam of this invention with other types of materials such as unfoamed polymeric materials and any other type of polymeric material. When a multi-layered article is produced, it is preferable to form adjacent layers using materials having similar viscosities and which provide interlayer adhesion.

Multilayer foam articles can also be prepared by laminating polymer or nonpolymer layers to a foam core, or by layering extruded foams as they exit their respective shaping orifices, with the use of some affixing means such as an adhesive. Other techniques that can be used include extrusion coating and inclusion coextrusion, which is described in U.S. Pat. No. 5,429,856, incorporated by reference.

Blowing agent component concentrations, exit pressure, and exit temperature can have a significant effect on the properties of the resulting foams including foam density, cell size, and distribution of cell sizes. A degree of interdependence also exists between blowing agent concentrations, pressure, and temperature with regard to processing conditions. It has been found that the more rapidly the melt is quenched, the more uniform, and smaller, the cell sizes of the foamed material. This is believed to be because the lower the exit temperature, the quicker the viscosity of the foaming material increases, thereby causing cell growth to be more quickly arrested.

With a relatively constant exit temperature, a change in blowing agent concentration can affect cell size and cell size uniformity. Even though the polydispersities may be approximately equivalent, a higher blowing agent concentration produces a smaller overall range of cell sizes, i.e., a smaller standard deviation. However, it should be noted that at high exit temperatures, as blowing agent concentration increases, the average cell size may decrease even though polydispersity increases. This can occur when the range of cell sizes increases, but the distribution of cell sizes causes the calculated average cell size to decrease.

The blowing agent concentration in the system, i.e. the partial pressures, is primarily controlled by the physical blowing agent concentrations of $CO_2$ and $N_2$, the pressures and polymer flowrates. Depending on the operating and exit pressures of the process, the actual solubility of the physical blowing agent in the polymer can change. An increase in pressure will increase solubility, thereby allowing increased $CO_2$ and $N_2$ concentrations in the melt solution. Therefore, by controlling the pressure in the process, the properties of the foam material can be manipulated by changing the physical blowing agent solubility limit of the polymer.

Suitable physical blowing agent concentration typically range from below, to above, the blowing agent's saturation point in the neat polymer of the material being used to make the foam, depending on the desired properties of the resulting foams. Typically, the preferable blowing agent concentration range is 50 to 110% of what the blowing agent's saturation level would be in the neat polymer material.

The $CO_2$ and $N_2$ blowing agents are used in mass ratios of 80:20 to 20:80, preferably 50:50 to 20:80. It has been observed that a mixture of $CO_2$ and $N_2$ provides superior results than either blowing agent gas used alone. It has been observed that $CO_2$ alone will diffuse out of the polymer matrix too rapidly; the resulting cells are not stable and collapse. $N_2$ alone may not sufficiently soluble to produce a useful foam. While not wishing to be bound by theory, it is believed that the $CO_2$ substantially swells the (meth)acryloyl polymer, allows the $N_2$ to more rapidly migrate into the polymer matrix and increases the diffusion coefficient which increases the rate at which the partial pressure approaches the head space pressure of the gases. In addition the use of $CO_2$ in the $CO_2/N_2$ mixture apparently increases the solubility (partial pressure) of the $N_2$ dissolved in the (meth)acryloyl polymer matrix, by increasing the solubility thereof. See McHugh and Krukonis, *Supercritical Fluid Extraction*, 2$^{nd}$ Edition, Butterworth-Heinemann, N.Y., 1994, pp. 356-66.

The pressure of the melt solution in the extruder is dependent on orifice size, amount of blowing agent, polymer flow rate, polymer viscosity, polymer type, and temperature. Decreasing the size of the die exit can increase exit and operating pressures. Decreasing the process and exit temperatures and decreasing blowing agent concentration can result in higher pressures. The lower the blowing agent concentration, the more significant the effect of changing the temperature on the pressure. It should also be noted, that, in general, at higher pressures, the (meth)acryloyl polymer can dissolve more physical blowing agent.

In general, as the melt solution exits the die, it is preferable to have a large pressure drop over a short distance. Keeping the solution at a relatively high pressure until it exits the die helps to form uniform cell sizes. Maintaining a large pressure drop between the exit pressure and ambient pressure can also contribute to the quick foaming of a melt solution. The upper limit for forming a foam with uniform cells will depend on the critical pressure of the blowing agent being used. In general, the inventors found that for the polymers used in the examples, the higher final section (section F of FIG. 3, immediately prior to the die) pressure limit for forming acceptably uniform cells is approximately 6.9 MPa (1000 psi), preferably 5.2 MPa (750 psi), more preferably 3.5 MPa (500 psi).

The optimum exit temperature, exit pressure, and blowing agent concentration for a particular foamable material will depend on a number of factors such as the type and amount of polymer(s) used; the physical properties of the polymers, including viscosity; the solubility of the polymer(s) in the blowing agent; the type and amount of additives used; the thickness of the foam to be produced; whether the foam will be coextruded with another foam or an unfoamed material; and the die gap and die orifice design.

A physical blowing agent component comprises a mixture of $CO_2$ and $N_2$ in relative mass ratios of 80:20 to 20:80. The physical blowing agent component may be introduced, i.e., injected into the polymeric material as a gas, or liquid, preferably as a gas mixture.

The polymer matrices of foams of the invention may comprise one or more pressure-sensitive (meth)acryloyl polymers, including random and block copolymers. Pressure sensitive adhesives (PSAs) are a distinct category of adhesives and a distinct category of thermoplastics, which in dry (solvent-free) form are aggressively, and permanently, tacky at room temperature. They firmly adhere to a variety of dissimilar surfaces upon mere contact without the need of more than finger or hand pressure. Pressure sensitive adhesives require no activation by water, solvent, or heat to exert a strong adhesive holding force toward such materials as paper, plastics, cellophane, glass, wood, and metals. They are sufficiently cohesive and elastic in nature so that, despite their aggressive tackiness, they can be handled with the fingers and removed from smooth surfaces without leaving a residue. PSAs can be quantitatively described using the "Dahlquist criteria" which maintains that the elastic modulus of these materials is less than $10^6$ dynes/cm$^2$ at room temperature. See Pocius, A. V., Adhesion & Adhesives: An Introduction, Hanser Publishers, New York, N.Y., First Edition, 1997.

The pressure-sensitive (meth)acryloyl polymer matrices of the foams may comprise one or more pressure sensitive (meth)acryloyl polymers. It may be desirable to use two or more polymers having different compositions to achieve unique foam properties. A wide range of foam physical properties can be obtained by selectively choosing the PSA component types and concentrations. A particular (meth)acryloyl adhesive copolymer may be selected based upon the desired properties of a final foam-containing article.

The (meth)acryloyl adhesive copolymer useful in preparation of the adhesive foams are copolymers of (meth)acryloyl monomers, acid functional monomers, optionally other polar monomers, and optionally other vinyl monomers.

The (meth)acrylate ester monomer useful in preparing the acid functional (meth)acrylate adhesive copolymer is a monomeric (meth)acrylic ester of a non-tertiary alcohol, the alcohol of which contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable source, such as 2-octanol, citronellol, dihydrocitronellol.

In some embodiments it is desirable for the (meth)acrylic acid ester monomer to include a high $T_g$ monomer, have a $T_g$ of at least 25° C., and preferably at least 50° C. Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of 85 to 99.5 parts by weight based on 100 parts total monomer content used to prepare the polymer. Preferably (meth) acrylate ester monomer is present in an amount of 90 to 95 parts by weight based on 100 parts total monomer content. When high $T_g$ monomers are included, the copolymer may include up to 30 parts by weight, preferably up to 20 parts by weight of the 85 to 99.5 parts by weight of (meth)acrylate ester monomer component.

The polymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 1 to 15 parts by weight, most preferably 5 to 10 parts by weight, based on 100 parts by weight total monomer.

The polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional monomers.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The polar monomer may be present in amounts of 0 to 10 parts by weight, preferably 0.5 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

the (meth)acryloyl copolymer generally comprises:
i. 85 to 99.5 parts by weight of an (meth)acrylic acid ester of non-tertiary alcohol;
ii. 0.5 to 15 parts by weight of an acid functional ethylenically unsaturated monomer;
iii. 0 to 10 parts by weight of a non-acid functional, ethylenically unsaturated polar monomer;
iv. 0 to 5 parts vinyl monomer; and
v. 0 to 5 parts of a multifunctional (meth)acrylate;
based on 100 parts by weight total monomer.

The (meth)acrylate copolymers can be prepared by any conventional free radical polymerization method, including solution, radiation, bulk, dispersion, emulsion, and suspension processes. The separately prepared copolymer is then combined with the solvent monomer. The (meth)acrylate polymers may be prepared via suspension polymerizations as disclosed in U.S. Pat. Nos. 3,691,140 (Silver); 4,166,152 (Baker et al.); 4,636,432 (Shibano et al); 4,656,218 (Kinoshita); and 5,045,569 (Delgado). Each describes adhesive compositions, and the descriptions of polymerization processes are incorporated herein by reference.

Water-soluble and oil-soluble initiators useful in preparing the acid functional copolymers are initiators that, on exposure to heat, generate free-radicals which initiate (co)polymerization of the monomer mixture. Water-soluble initiators are preferred for preparing the (meth)acrylate polymers by emulsion polymerization. Initiators may comprise from about 0.05 to about 1 part by weight, preferably about 0.1 to about 0.5 part by weight based on 100 parts by weight of monomer components in the (meth)acrylate copolymers.

The copolymerizable mixture may optionally further comprise chain transfer agents to control the molecular weight of the resultant polymer. Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The emulsion mixture may further comprise up to about 0.5 parts by weight of a chain transfer agent, typically about 0.01 to about 0.5 parts by weight, if used, preferably about 0.05 parts by weight to about 0.2 parts by weight, based upon 100 parts by weight of the total monomer mixture.

Solventless polymerization methods, such as the continuous free radical polymerization in an extruder described in U.S. Pat. Nos. 4,619,979 (Kotnour, et al.) and 4,843,134 (Kotnour, et al.); the essentially adiabatic polymerization methods using a batch reactor described in U.S. Pat. No. 5,637,646 (Ellis). A preferred method of preparing the (meth) acryloyl adhesive copolymers by the methods described for polymerizing packaged pre-adhesive compositions is described in U.S. Pat. Nos. 5,804,610, 5,932,298 and 6,294,249 (Hamer et al.), and the disclosure of each is incorporated herein by reference.

In certain preferred embodiments, the (meth)acryloyl adhesive foam is cured by UV radiation rather than ionizing radiation. In such instances, the monomer mixture will further comprise a polymerizable photocrosslinker and the resultant (meth)acryloyl polymer will comprise polymerizable monomer units of the same. Such polymerizable photocrosslinkers comprises a photoinitiator group and a polymerizable, ethylenically unsaturated group, such as a (meth) acryloyl group.

Preferred photocrosslinker monomers include ethylenically unsaturated compounds having the functionality represented by the structure:

wherein $R^6$ is wherein $R^7$ is H or a $C_1$ to $C_6$ alkyl group,
each $R^8$ is independently a hydroxyl group, a phenyl group, a $C_1$ to $C_6$ alkyl group, or a $C_1$ to $C_6$ alkoxy group.

The photocrosslinker compounds having a photoinitiator groups may be of the general formula:

X is —O— or —$NR^9$—;
$R^9$ is H or a $C_1$ to $C_4$ alkyl group, preferably H or a methyl group;
m is 0 or an integer from 1 to 5;
a, b, and c are independently 0 or 1;
$M^1$ is $C(R^9)_2$ or $Si(R^9)_2$, wherein each $R^9$ is independently H or a $C_1$ to $C_4$ alkyl group;
$M^2$ is O, $NR^9$, C(O), C(O)O, $C(O)NR^9$, or $OC(O)NR^9$, wherein each $R^9$ is independently H or a $C_1$ to $C_4$ alkyl group;
G is a covalent bond, $(CH_2)_d$, or $(CH_2)_dO$ where d is an integer from 1 to 4, preferably from 1 to 2;
P* is a photoinitiator group, such as the radiation-sensitive α-cleaving group (supra).

In another embodiment the various compounds from which P* can be derived are aromatic ketones. Such ketones are known to be "hydrogen abstracting agents". When activated by absorption of ultraviolet light, these P* groups can act to crosslink the (meth)acryloyl polymer. Thus, P* is a moiety derived from an acetophenone, benzophenone, anthraquinone, 9-fluorene, anthrone, xanthone, thioxanthone, acridone, dibenzosuberone, benzil, or chromone. Thus the monoacryl compounds having a photoinitiator group may comprise a hydrogen abstracting group.

Preferred P* groups include those derived from an acetophenone, benzophenone, anthraquinone, thioxanthone, chromone, and benzil. Particularly preferred are benzophenone and anthraquinone.

Particularly useful polymerizable phtocrosslinkers include the following compounds, or the analogous amides:

The foamable melt mix may be neat, or may also include other additives. Examples of suitable additives include tackifiers (e.g., rosin esters, terpenes, phenols, and aliphatic, aromatic, or mixtures of aliphatic and aromatic synthetic hydrocarbon resins), surfactants, plasticizers (other than physical blowing agents), nucleating agents (e.g., talc, silica, or $TiO_2$), pigments, dyes, reinforcing agents, solid fillers, hydrophobic or hydrophilic silica, calcium carbonate, toughening agents, flame retardants, antioxidants, finely ground polymeric particles (e.g., polyester, nylon, or polypropylene), expandable microspheres, glass beads, stabilizers (e.g., UV stabilizers), and combinations thereof. The additives may be added in amounts sufficient to obtain the desired properties for the foam being produced. The desired properties are largely dictated by the intended application of the foam or foam article.

If tackifiers are used, then up to about 50% by weight, preferably less than 30% by weight, and more preferably less than 5% by weight based on the dry weight of the total adhesive polymer would be suitable. In some embodiments no tackifiers may be used.

Suitable tackifiers for use with (meth)acrylate polymer dispersions include rosin acids, rosin esters, terpene phenolic resins, hydrocarbon resins, and cumarone indene resins. The type and amount of tackifier can affect properties such as contactability, bonding range, bond strength, heat resistance and specific adhesion.

Nucleating Agents

The foamable (meth)acryloyl composition may further comprise a nucleating agent, which may be any conventional nucleating agent. The amount of nucleating agent to be added depends upon the desired cell size, the selected foaming agent and the density of the vehicle. Examples of inorganic nucleating agents in small particulate form include clay, talc, silica, including silica nanoparticles, nanoclays, carbon nanotubes and diatomaceous earth. Organic nucleating agents that decompose or react at a given temperature may be used. Such nucleating agents enhance the rate and degree of nucleation and may reduce the rate of diffusion from the resulting foams.

One example of an organic nucleating agent is a combination of an alkali metal salt of a polycarboxylic acid with a carbonate or bicarbonate. Examples of useful alkali metal salts of a polycarboxylic acid include the monosodium salt of 2,3-dihydroxy-butanedioic acid (i.e., sodium hydrogen tartrate), the monopotassium salt of butanedioic acid (i.e. potassium hydrogen succinate), the trisodium and tripotassium salts of 2-hydroxy-1,2,3-propanetricarboxylic acid (i.e., sodium and potassium citrate, respectively), and the disodium salt of ethanedioic acid (i.e., sodium oxalate) and polycarboxylic acid such as 2-hydroxy-1,2,3-propanetricarboxylic acid, and combinations thereof. Examples of carbonate and bicarbonate include sodium carbonate, sodium bicarbonate, potassium bicarbonate, potassium carbonate and calcium carbonate and combinations thereof. One contemplated combination is a monoalkali metal salt of a polycarboxylic acid, such as monosodium citrate or monosodium tartrate, with a carbonate or bicarbonate. It is contemplated that mixtures of different nucleating agents may be added to the vehicle.

One preferred filler is glass or ceramic microbubbles, which have been found to stabilize the cellular structure of the foam when used in an amount of 1 to 30%, preferably 5-25%, by volume, of the composition prior to blowing agent injection. Above about 30 volume percent, the polymer foam is not stable on extrusion. The glass microbubbles may be added to the polymerizable monomer mixture or to the polymer melt in the extruder.

The glass bubble material can be an alkali or alkaline silicate material. The glass bubbles have a specific gravity of from about 0.1 to about 2.2, and a bulk density of about 0.1 to about 0.90 g/cc. The average wall thickness of the glass bubbles can be in the range of 0.5 to 2.0 micrometers. The glass bubble particle size can be from about 5 to 125 micrometers. A consideration in using the glass bubbles is selecting a grade of bubble with a crush strength greater than the anticipated pressure in the extrusion equipment.

Suitable glass bubbles as the filler used in the adhesive composition of the present invention include soda-lime-borosilicate glass bubbles having the trade designation Scotchlite™ K-37 Glass Bubbles and are available from 3M Company, Saint Paul, Minn. 55144. The Scotchlite™ K-37 glass bubbles are about 85 micrometers in external diameter and have a specific gravity of 0.37. The isostatic crush strength of the K-37 bubble is 20.7 MPa.

Another suitable glass bubble filler have the trade designation Scotchlite™ S-22 glass bubbles available from 3M Company, Saint Paul, Minn. 55144. Scotchlite™ S-22 glass bubbles are soda-lime-borosilicate glass bubbles of about 30 micrometers in external diameter and having a specific gravity of 0.22. Yet another suitable glass bubble filler have the trade designation Scotchlite™ S-60 Glass Bubbles and are available from 3M Company, Saint Paul, Minn. 55144, which are soda-lime-borosilicate glass bubbles of about 30 micrometers in external diameter and having a specific gravity of 0.60.

Assuming that the crush strength requirements are met, the filler can also be a ceramic material. For example, suitable ceramic filler include filler having the trade designation Zeeospheres™ type 850 and available from Zeelan Industries, Inc. Saint Paul, Minn. 55101. Zeeospheres™ type 850 are hollow, ceramic (silica-alumina alloy) spheres with relatively thick walls having a median particle size (by total population) of 17 micrometers in external diameter. Another suitable ceramic filler has the trade designation Z-Light™ W-1012 spheres also available from Zeelan Industries, Inc. Saint Paul, Minn. 55101. Z-Light™ W-1012 are hollow, ceramic (silica-alumina alloy) spheres having an average particle size of 100 micrometers in external diameter and a specific gravity of 0.7.

Surfactants may be useful additive in preparing the foams. Useful materials include polar and non-polar surfactants that can be anionic, cationic, or nonionic in nature. Surfactants lower surface tension between the (meth)acryloyl polymer and the blowing agent, promote the nucleation of bubbles, reduce stress concentration in the thinning cell walls to stabilize the rising foam and counteract the defoaming effect of any solids in the foam. Particularly useful surfactants include fluorinated surfactants such as FC 430™ (3M, St. Paul, Minn.). Surfactants will typically be present in the reaction mixture, preferably in an amount of no greater than about 10 parts by weight per 100 parts by weight of polymerizable monomer, more preferably no greater than about 5 parts by weight, and most preferably in the range of 0.5 to 3 parts by weight per 100 parts by weight of polymerizable monomer. Particularly useful, are fluorosurfactants, alkylphenoxy-polyglycidols, and the like.

Fluorosurfactants are known and described generally in "Fluorinated Surfactants" by E. Kissa, Surfactants Science Series, Vol. 50 (Marcel Dekker, New York 1994). Fluorosurfactants including those derived from $C_4$ perfluoroalkyl groups are also described in U.S. Pat. Nos. 4,167,639, 3,906, 027, 5,342,986 and 5,502,251. In particular, fluorochemical surfactants derived from nonafluorobutanesulfonyl fluoride (PBSF) have been described more recently in U.S. Pat. No. 6,664,354 (Savu et al.), incorporated herein by reference In some embodiments, other useful fluorinated surfactants include acids of the formula $X(CnF_{2n+2})COOH$, where n is an integer in the range of 3-20 and X is hydrogen or fluorine. Alkali metal salts of such acids are also effective surfactants. In addition, ammonium, amine, and quaternary ammonium salts of such acids are also useful. Examples of such compositions include ammonium perfluoroobutanoate. Other useful carboxylate-type surfactants are described by the general formula $R_fCH_2CH_2SCH_2CH_2COOM$, where $R_f=F(CF_2CF_2)_x$, with X=1 to about 9, and M is ammonium, lithium, sodium or potassium; the lithium salt is available from E. I. du Pont de Nemours and Co. under the name Zonyl™ FSA fluorinated surfactant. Phosphoric acid esters of perfluoroalkanols of the formula $(R_fCH_2\ CH_2O)xP(O)(ONH_4)_y$, where $R_f=F(CF_2CF_2)_z$ with x=1 or 2, y=2 or 1, x+y=3, and z=1 to about 7, available under the trade name Zonyl™ FSP fluorosurfactant. This type of surfactant is also available in the acid form (i.e. the $(ONH_4)_y$ groups are replaced by $(OH)_y$ groups) under the trade name Zonyl™UR fluorosurfactant, from which the ammonium, lithium, sodium and potassium salts can be prepared by neutralization with the respective bases.

Sulfuric acid esters of polyfluoroalkanols of the formula $R_fCH_2CH_2SO_3X$, where $R_f=F(CF_2CF_2)_y$, y=1 to about 9, X=H or $NH_4$, lithium, sodium, or potassium may also be used as fluorosurfactants. An example of such a fluorosurfactant where X is H or $NH_4$ is Zonyl™ TBS fluorosurfactant, available from E. I. du Pont de Nemours and Co.

In some embodiments, preferred particulate additives are surface modified nanoparticles, such as those described in U.S. Pat. No. 6,586,483 (Kolb et al.), incorporated herein by reference. In such additives the individual nanoparticles have a particle diameter no greater than about 50 nanometers, and are selected from the group consisting of silica, titania, alumina, zirconia, vanadia, ceria, iron oxide, antimony oxide, tin oxide, aluminum/silica and combinations thereof. For the (meth)acryloyl adhesive polymers, the nanoparticles are desirably functionalized with hydrophobic groups, such as isooctyl, or decyl groups. It has been found that such surface-modified nanoparticles can stabilize the foam and may comprise 0.5% to 10% by weight of the monomer composition. The nanoparticles are added to the monomer mixture.

The disclosure features materials and articles that comprise a (meth)acryloyl adhesive foam. The foam may be provided in a variety of shapes, including a rod, a tube, a sheet, including a sheet having a patterned profile, etc., depending on the die shape. In some embodiments, e.g., when the foam is provided in the form of a sheet or a tube, the foam will have two major surfaces.

Examination of the foams by electron microscopy reveals that the preferable foam structure is characterized by cell sizes of 2 to 200 .mu.m, more preferably cell sizes of 5 to 50 µm. The preferable foam structures may also be characterized by cell size distributions having a polydispersity from 1.0 to 2.0, preferably from 1.0 to 1.5, and most preferably from 1.0 to 1.2.

Foams were tested for energy dissipation properties and found suitable for applications such as vibration damping. Damping is the dissipation of mechanical energy as heat by a material in contact with the source of that energy. It is desirable that the damping occur over a wide range of temperatures (e.g. −50° C. to 200° C.) and a broad frequency range from as low as about 0.1 to 5 Hertz (Hz), the frequency range over which tall buildings experience wind sway or seismic vibrations, to higher frequencies such as 1 kilohertz (kHz) experienced by computer disk drives, to even higher frequencies of 5 to 10 kHz experienced in high cycle fatigue applications.

For damping applications, it is further desirable that the damping material, sometimes referred to as viscoelastic material, have the following properties: (1) damping capabilities at high temperatures e.g., at 50° C. and above, preferably 100° C. and above; and (2) damping performance that is substantially independent of temperature over the useful temperature range. In terms of measured characteristics, the composition should ideally have a high loss factor (tan δ) and a modulus (G', G") that is independent of temperature. It is desirable for the damping material to possess adhesive properties.

Applications where damping is required over a broad temperature range include are useful in a variety of applications that require good adhesion to different substrates, including low surface energy materials, broad temperature range, minimized influence from humidity. They are particularly useful in electronic industry to assemble electrical components, wire tacking, wire terminal bonding, insulations, potting, and sealing. In particular, the adhesive foams may be used in held-held electronic devices such as cell phones.

The adhesive foams of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as a paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics (e.g., glass), metals.

The adhesive foams may be coextruded with or laminated on a variety of flexible and inflexible substrates using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Examples of inflexible substrates include, but are not limited to, metal, metallized polymeric film, indium tin oxide coated glass and polyester, PMMA plate, polycarbonate plate, glass, or ceramic sheet material.

The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated. The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive foam can also be provided in the form of a pressure-sensitive adhesive transfer tape in which at least one layer of the adhesive is disposed on a release liner for application to a permanent substrate at a later time. The adhesive foam can also be provided as a single coated or double coated tape in which the adhesive is disposed on a permanent backing Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

EXAMPLES

Probe Tack Test Method

In a constant temperature and humidity room (23° C., 50% relative humidity), probe tack measurements were performed on each sample, using a TA.XT PLUS Texture Analyzer from Stable Micro Systems Ltd. of Surrey, United Kingdom. During this test, a stainless steel cylindrical probe (6 mm diameter) with a flat tip was brought into contact with an adhesive layer on a glass slide under a contact force of 3000 grams for 60 seconds. Then the probe was pulled away with a constant velocity of 0.01 mm per second until completely debonded. The force applied to the probe during debonding was recorded as a function of the probe displacement distance. The strength of the adhesive joint is given by the rupture energy, which was calculated as an integration of the force against displacement during the debonding process, i.e., the area under the force-displacement curve.

Example 1

An extruder generally is depicted in FIG. 3 was provided. A 26 mm diameter co-rotating twin screw extruder, corresponding to element 64 and available as "ZE25A×42D UTX" from Berstorff of Florence, Ky., was provided. The twin screw extruder had a length to diameter ratio of 42:1, and was operated at 200 rpm with all heating elements set to 149° C.

This twin screw extruder had 10 zones, each corresponding to one tenth of the length of the screw. In the description below, the position of components will be described both in terms of zones 1 through 10 along the length, and in terms of the Sections A through D in FIG. 3.

A 2" Single Packer Extruder commercially available from The Bonnot Company of Uniontown, Ohio, corresponding to element 62 in FIG. 3, was employed for feeding masticated polymer into the twin screw extruder. This was positioned in Zone 1 and segment A. This polymer was a 90/10/0.03/0.10 by weight mixture of 2-ethylhexyl acrylate, acrylic acid, isooctylthioglycolate and acryloyl benzophenone, and was fed by the single packer extruder at a rate of 2.27 kg/hr and a temperature of 149° C. A volumetric twin screw stirring feeder, commercially available as "DDSR12" from Brabender Technologie, Inc. of Mississauga, ON, Canada, was present for later Examples where it was desired to introduce additives into Zone 2 of the extruder.

The twin screw extruder further comprised forward kneading segments in Zones 3 and 4, a reverse kneading segment in Zones 3 and 5 (corresponding to Section B in FIG. 3). This screw design was configured to quickly melt and knead the polymer in the initial zones of the extruder to create a polymer seal prior to injection of the physical blowing agent. A physical blowing agent, comprising a premixed gas blend of 70/30 $N_2/CO_2$ (w/w), was admitted into Zone 6 (corresponding to Section C in FIG. 3) at 3.0 MPa using a pressure regulator. Gear mixers were present in Zones 7 and part of zone 8, simple conveying elements were present in the rest of zone 8 and zones 9 and 10, and a pressure transducer was present in zones 9 and 10 (corresponding to Section D in FIG. 3). The arrangement of screw elements downstream of the blowing agent injection was to facilitate mixing and distribution of the blowing agent into the polymer.

After the melt mixture passed through the extruder, it entered a polymer melt pump corresponding to element 66, providing 4.03 cm³/revolution, and commercially available as "MSDP 110/043" from Dynisco of Hickory, N.C. The temperature of the melt pump was set to 149° C. Material exiting the polymer melt pump was conducted through a heated (149° C.) neck tube to an exit shaping die corresponding to element 68 in FIG. 3. A pressure transducer located between the neck tube and the die reported a "pre-die system pressure" of 6.48 MPa.

The die was a sheet extrusion die commercially available from Extrusions Dies Industries of Chippewa Falls, Wis., and the temperature was set to 149° C. As the melt mixture exited the die, the physical blowing agent expanded causing nucleation and cell formation whereby the melt solution foamed and formed a continuous sheet upon cooling.

The continuous sheet was laminated between two sheets of 2 mil (0.05 mm) thick polyester release liner. Several physical parameters, such as adhesive thickness and density, were then measured. These values and several process parameters are summarized in Table 1. In Table 1, "System Pressure" refers to the pressure of section D as measured by a pressure transducer.

Example 2

Example 2 is similar to Example 1, except that after lamination of the two release liners, the continuous sheet was cured through the top liner by the application of e-beam radiation emitted by an e-beam generator commercially available as "Broadbeam EP Series" from PCT Engineered Systems, LLC of Davenport, Iowa. A 4.78 Mrad dose was delivered by operating the generator at 260 kVolts and 6.4 mA. When the curing was complete, several physical parameters were measured. These values and several process parameters are summarized in Table 1.

Example 3

Example 3 is similar to Example 1, except that after lamination of the two release liners, the top liner was removed, and the sheet was cured by exposure to UV radiation. More specifically, a source using H-bulbs commercially available as "Model DRS-120 UV Processor" from Fusion UV Systems, Inc. of Gaithersburg, Md., was operated on low lamp power to deliver 50 mJ/cm² UVC. The amount of UV exposure was measured by a UV Power Puck from EIT, Inc. of Sterling, Va., using the UVC measurement setting. When the curing was complete, several physical parameters were measured. These values and several process parameters are summarized in Table 1.

Examples 4-6

Examples 4-6 are similar to Examples 1-3, respectively, except that an additive was introduced into the twin screw extruder via the volumetric twin screw stirring feeder.

More specifically, one part by weight per hundred parts of polymer of powdered talc, commercially available from Mallinckrodt Baker, Inc. of Phillipsburg, N.J., was introduced. Process parameters and measurements of the finished sheet are summarized in Table 1.

Examples C1-C3

Examples C1-C3 are Comparative Examples similar to Examples 1-3, respectively, except that no physical blowing agent was introduced at Zone 6. Process parameters and measurements of the finished sheet are summarized in Table 1.

Examples C4-C6

Examples C4-C6 are Comparative Examples similar to Examples 4-6, respectively, except that no physical blowing agent was introduced at Zone 6. Process parameters and measurements of the finished sheet are summarized in Table 1.

Example 7

To measure the amount of $CO_2$ dissolved in the polymer melt, the following procedure was followed. The same extruder set up was used here as in Example 1, except that the polymer feed rate was set to 6.2 lb/hr (2.81 kg/hr) and the screw speed was set to 12 rpm. A sample of the melt mixture was drawn from Zone 10 of the twin-screw extruder by means of a stainless steel adaptor tube, wrapped with heating tape, and a α-way valve. The valve was connected to a 0.6 L Monel Bomb vessel commercially available from Parr Instrument Company of Moline, Ill. The vessel was equipped with three ports: one port was used for sample collection, while the other two served for headspace analysis. After the melt mixture sample was collected, the valve was closed. The sample headspace gas was then drawn into an FTIR cell under vacuum, and the mass of $CO_2$ was determined based on the gas-phase concentration and the volume of the FTIR cell. Compressed nitrogen was purged through the bottle/vessel to de-volatilize any residual $CO_2$ until the concentration dropped below the detection limit. Based on these measurements, the amount of $CO_2$ dissolved in the polymer (mass $CO_2$ per unit mass of polymer) was determined to be 0.71% by weight. The amount of $N_2$ could not be determined by this method since the gas itself was used as a purging medium during FTIR analysis.

TABLE 1

| Ex. | Additive | Additive Conc. (phr) | Total Feed Rate (g/min) | Gas Pressure (MPa) | System Pressure (MPa) | Line Speed (m/min) | Cure Conditions | Thickness (um) | Mass per 10.16 cm × 15.24 cm Area (g) | Density (g/cm³) | Probe Tack (N-s) |
|---|---|---|---|---|---|---|---|---|---|---|---|
| 1 | none | N/A | 37.8 | 3 | 6.48 | 2.68 | none | 137 | 1.58 | 0.74 | 146 |
| 2 | | | | | | | E-beam, 47.8 kGy (260 kV, 6.4 mA) | 132 | 1.58 | 0.77 | 127 |
| 3 | | | | | | | UVC 500 mJ/cm² | 140 | 1.60 | 0.74 | 117 |
| 4 | talc | 1 | 38.2 | 3 | 6.48 | 4.02 | none | 127 | 1.03 | 0.52 | 118 |
| 5 | | | | | | | E-beam, 52.5 kGy (250 kV, 9.4 mA) | 127 | 1.03 | 0.52 | 96.4 |
| 6 | | | | | | | UVC 500 mJ/cm² | 127 | 1.04 | 0.53 | 79.2 |
| C-1 | none | N/A | 37.8 | N/A | 6.96 | 2.68 | none | 99 | 1.62 | 1.06 | 132.8 |
| C-2 | | | | | | | E-beam, 48.2 kGy (260 kV, 6.4 mA) | 102 | 1.64 | 1.04 | 97.3 |
| C-3 | | | | | | | UVC 500 mJ/cm² | 99 | 1.61 | 1.05 | 99.6 |
| C-4 | talc | 1 | 38.2 | N/A | 6.55 | 4.02 | none | 64 | 1.04 | 1.06 | 81.2 |
| C-5 | | | | | | | E-beam, 55.8 kGy (250 kV, 9.4 mA) | 64 | 1.04 | 1.06 | 59.9 |
| C-6 | | | | | | | UVC 500 mJ/cm² | 64 | 1.01 | 1.03 | 57.1 |

What is claimed is:

1. A continuous method for making an adhesive foam material comprising:
   (1) mixing at least one pressure-sensitive (meth)acryloyl polymer and a $CO_2/N_2$ blowing agent mixture in an extrusion apparatus having an exit shaping orifice at a temperature to form a melt solution wherein the blowing agent is uniformly distributed throughout the polymeric material and wherein the partial pressure of the blowing agent is less than 750 psi in the polymer melt;
   (2) conveying the melt solution though the extrusion apparatus, wherein the system pressure in the final section of the extrusion apparatus is 250 to less than 1000 psi (1.7 to 6.9 MPa);
   (3) passing the solution through said exit shaping orifice and exposing the solution to atmospheric pressure, whereby the blowing agent expands causing nucleation and cell formation resulting in the melt solution foaming and solidifying at or about the time it exits the shaping orifice;
   (4) rapidly cooling the polymer melt to arrest cell growth and coalescence, and
   (5) crosslinking the resulting (meth)acryloyl foam polymer.

2. The method of claim 1 wherein the blowing agent comprises $CO_2$ and $N_2$ in a mass ratio of 80:20 to 20:80.

3. The method of claim 1 comprises $CO_2$ and $N_2$ in a mass ratio of 50:50 to 20:80.

4. The method of claim 1 wherein the (meth)acryloyl foam polymer is crosslinked by ionizing radiation.

5. The method of claim 1 further comprising controlling one or both of the exit temperature and blowing agent partial pressure to produce a foam having cell sizes of 2 to 200 μm.

6. The method of claim 1 wherein the elastic modulus of the (meth)acryloyl polymer is less than $10^6$ dynes/cm² at room temperature.

7. The method of claim 1 wherein the (meth)acryloyl copolymer comprises:
   i. 85 to 99.5 parts by weight of an (meth)acrylic acid ester monomer units;
   ii. 0.5 to 15 parts by weight of an acid functional ethylenically unsaturated monomer units;
   iii. 0 to 10 parts by weight of a non-acid functional, ethylenically unsaturated polar monomer units;
   iv. 0 to 5 parts vinyl monomer units; and
   v. 0 to 5 parts of a multifunctional (meth)acrylate monomer units.

8. The method of claim 1 wherein the melt solution is conveyed through the final section of the extrusion apparatus at system pressure of less than 5.2 MPa (750 psi).

9. The method of claim 1 wherein the melt solution is conveyed through the final section of the extrusion apparatus at a blowing agent partial pressure of less than 5.2 MPa (750 psi).

10. The method of claim 1 wherein the melt solution is conveyed through the final section of the extrusion apparatus at system pressure of less than 3.5 MPa (500 psi).

11. The method of claim 1 wherein the melt solution is conveyed through the final section of the extrusion apparatus at a blowing agent partial pressure of less than 3.5 MPa (500 psi).

12. The method of claim 7 wherein the (meth)acryloyl copolymer further comprises polymerized photocrosslinking monomer units.

13. The method of claim 1 wherein the extrusion apparatus comprises a first section A where polymer is fed into the apparatus to form a polymer melt, a section C where blowing agent is injected into the polymer melt, and a section B which isolates the pressures in sections A and section C.

14. The process of claim 1, wherein the system pressure in the shaping orifice is less than 1000 psi (6.9 MPa).

15. The process of claim 14, wherein the system pressure in the shaping orifice is 1.4 to 4.8 MPa.

16. The process of claim 1, wherein the operating temperature of the extrusion apparatus is at least 100±10° C.

17. The process of claim 1, wherein the system pressure in the final section of the extrusion apparatus is 250 to less than 750 psi (1.7 to 5.2 MPa).

18. The process of claim 1, wherein system pressure in the final section of the extrusion apparatus is measured immediately prior to the shaping orifice.

\* \* \* \* \*